United States Patent [19]

Nagayoshi et al.

[11] 3,916,953
[45] Nov. 4, 1975

[54] HEAT INSULATING HOSE

[75] Inventors: Akio Nagayoshi, Sakai; Kenji Morii, Osaka; Yasunori Sakai, Sakai, Japan

[73] Assignees: Mitsubishi Petrachemical Co., Ltd.; U C Sangyo Co., Ltd., Japan

[22] Filed: Sept. 17, 1973

[21] Appl. No.: 397,802

Related U.S. Application Data

[63] Continuation-in-part of Ser. No. 373,306, June 25, 1973, abandoned.

[30] Foreign Application Priority Data

June 24, 1972 Japan.............................. 47-75005
Nov. 20, 1972 Japan............................. 47-134053

[52] U.S. Cl. .............. 138/129; 138/132; 138/137; 156/431
[51] Int. Cl.²................... F16L 11/08; F16L 11/12
[58] Field of Search..... 138/129, 131, 133, 134–136, 138/139, 144, 149, 154, 122, 153, 132; 156/431, 173

[56] References Cited
UNITED STATES PATENTS

| | | |
|---|---|---|
| 2,874,722 | 2/1959 | Hamblin .............................. 138/134 |
| 2,874,723 | 2/1959 | Kahn................................ 138/129 X |
| 2,927,625 | 3/1960 | Rothermel et al.............. 138/134 X |
| 3,548,882 | 2/1970 | Rinker ................................ 138/129 |
| 3,554,237 | 2/1971 | Pelley et al. ........................ 138/153 |

Primary Examiner—Richard C. Queisser
Assistant Examiner—Daniel M. Yasich
Attorney, Agent, or Firm—Robert E. Burns; Emmanuel J. Lobato; Bruce L. Adams

[57] ABSTRACT

A heat insulating hose is made by simultaneously winding a first strip of heat insulating material, for example foam plastic and a wider thinner second strip of plastic material around a mandrel in such manner that a first edge portion of the second strip forms the inner surface of the hose, a second opposite edge portion forms the outer surface of the hose and a third intermediate portion connects the first and second portions and lies between successive convolutions of the first strip. Preferably a plastic covered wire is wound on the mandrel with the strips so as to lie flush with the inner surface of the hose, the plastic covering being bonded to the contiguous portions of the second strip.

13 Claims, 9 Drawing Figures

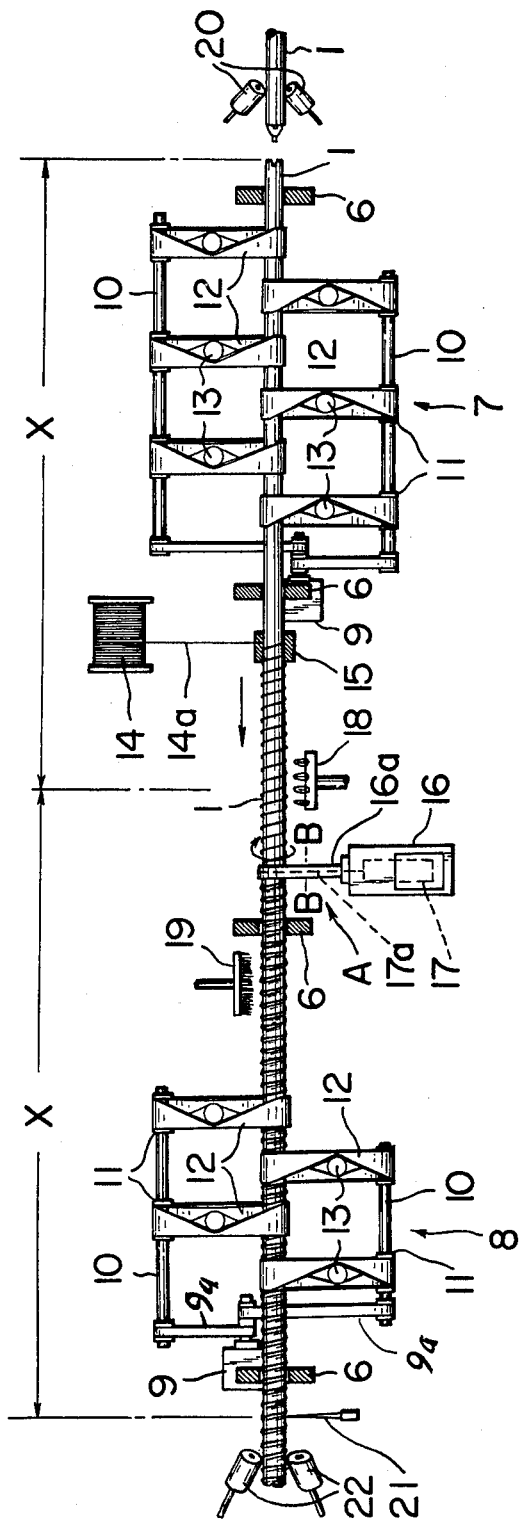

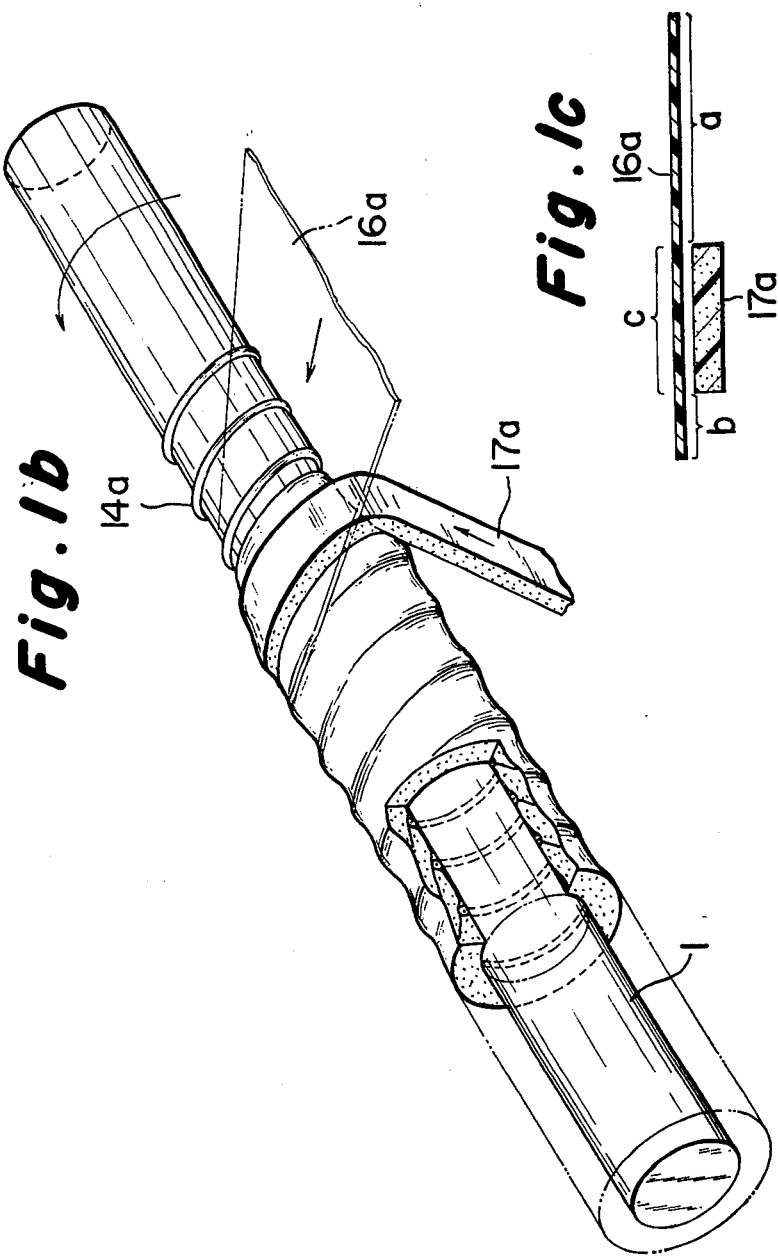

HEAT INSULATING HOSE

This application is a continuation-in-part of our application Ser. No. 373,306 filed June 25, 1973, now abandoned.

The present invention relates to a hose, more particularly, to an adiabatic or heat-insulating hose used for a drain hose in a cooler. In a pipe arrangement such as for an air cooler, vinyl hose or sponge coated hose is used for heat insulation. However, such vinyl hose has a drawback of producing water drops on its surface in operation, due to the difference of temperature between inner tube and outer tube. While, sponge coated hose does not have this drawback, it has other drawbacks. It is difficult to assemble the pipe arrangement and it requires a troublesome and time wasting process to coat the pipe with sponge. Moreover, the appearance of the hose is bad.

The present invention eliminates these drawbacks and provides flexible, light and cheap adiabatic or heat-insulating hose, which is capable of use as a drain hose of a cooler without producing water drops on its surface, and can be installed easily due to its flexibility.

Thus, a first object of the present invention is to provide a hose consisting of an inner tube and an outer tube and a flexible heat-insulating belt or tape which extends helically between said inner and outer tubes.

A second object of the present invention is to provide a method of manufacturing such hose and apparatus for carrying out the method.

A third object of the present invention is to provide hose which it is possible to make by one step continuously and automatically.

A fourth object of the present invention is to provide adiabatic hose insulating fluid from heat more effectively by employing a foam plastic resin belt as a flexible tape.

A fifth object of the present invention is to provide adiabatic hose employing multiple adiabatic balls or beads instead of a flexible belt so as to obtain a more flexible hose.

A sixth object of the present invention is to provide hose in which a middle portion extending between inner and outer tubes is thin in spite of the fact that inner tube and/or outer tube is thick so as to get better insulating effects.

A seventh object of the present invention is to provide hose of high flexibility by using a flexible belt the width of which is approximately the same as the pitch of the helix.

An eighth object of the present invention is to provide hose having high insulating property provided by a multilayer flexible belt.

A ninth object of the present invention is to provide hose in which inner and outer layers are bonded to a flexible belt without using any adhesive.

The construction of the invention and method and apparatus for manufacturing it, together with additional objects and advantages thereof, will be best understood from the following description of specific embodiments when read in connection with the accompanying drawings, in which:

FIG. 1a is a schematic front view illustrating apparatus for manufacturing hose in accordance with the present invention;

FIG. 1b is a schematic perspective view illustrating the method of manufacturing the hose;

FIG. 1c is a cross section of strips of material which are wound on a mandrel to produce the hose;

Figure 2:
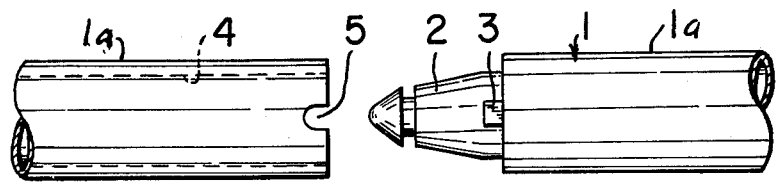
FIG. 2 is a side view showing the connecting ends of mandrel sections.
Figure 3:
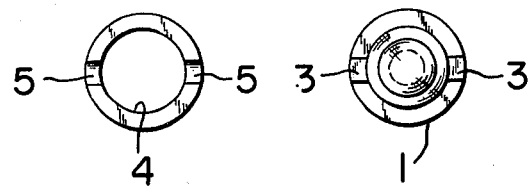
FIG. 3 is an end view of the mandrel sections shown on FIG. 2.

The apparatus shown schematically in FIG. 1a for manufacturing heat insulating hose in accordance with the present invention comprises a mandrel 1 made up of identical mandrel sections 1a each of a constant length $x$. Each of the mandrel sections 1a has a conical projection 2 and a key 3 at one end. The other end has a bore 4 to receive the projection 2 and a recess 5 to receive the key 3 of an adjacent mandrel section. The mandrel 1 is rotatably supported by a plurality of bearings 6 which are spaced apart a distance less than the distance $x$ so that a mandrel made up of a plurality of aligned sections is rotatably supported throughout its length.

Driving means 7 and 8 are provided for rotating the mandrel and feeding it axially toward the left as viewed in FIG. 1a. Each of the drive means 7, 8 is located between bearings 6 and comprises pulleys 11 fixed on rotatable shafts 10 driven in the same direction by a motor 9 through belts 9a. Belts 12 driven by the pulleys 11 engage the mandrel 1 in the case of the drive means 7 and engage the tube formed on the mandrel in the case of drive means 8. As the two shafts 10 of each drive means are located on opposite sides of the mandrel, lateral forces acting on the mandrel by reason of belt tension balance out. Guide means 13 inserted between opposite runs of each of the belts 12 between the pulley 11 and the mandrel twist the belt so as to produce a feeding movement to the mandrel in an axial direction (toward the left as viewed in FIG. 1a). The rotating speed of the drive means 8 is faster than that of the drive means 7 but the feeding speed of the drive means 8 is less than that of the drive means 7. The rotating speeds are determined by motor speed and pulley diameters while the feeding speeds in an axial direction are determined and adjusted by the twist of the belts 12 by means of the guides 13. It is also possible to produce axial feeding movement of the mandrel by inclining the shafts 10 to the mandrel instead of twisting the belts 12. In this case the guides 13 are unnecessary.

Piano or steel wire 14a coated with plastic or wrapped with plastic resin string is supplied from a rotatably supported reel 14 and is guided onto the mandrel through a guide box 15 so as to be wound on the mandrel in helical form with constant pitch as the mandrel is rotated and moved axially by the guide means 7, 8. The guide box 15 is located between two bearings 6 and is downstream of the drive means 7 with reference to the axial movement of the mandrel.

At a position downstream of the wire guide box 15 there is provided an extruder 16 which extrudes a thermoplastic resin strip or belt 16a in melted state onto the mandrel 1. At the same location a thick flexible strip or belt 17a of heat insulating material, for example foam plastic resin, is supplied by a reel 17 and is guided onto the mandrel together with the melted plastic resin belt 16a. The belt 17a is on the inner side of the melted thermoplastic belt 16a and is narrower than the belt 16a so that opposite sides of the belts 16a laterally beyond the sides of the belt 17a as illustrated in FIG. 1c. A heating device 18 comprising for example a gas fire flame is provided for heating the mandrel between the wire guide 15 and the extruder 16. A cooling device 19, for example a cooling water spray is located downstream of the extruder 16. A pair of feeding rollers 20 is provided for feeding successive sections of the mandrel to the wrapping apparatus. The feed rollers 20 are arranged obliquely to the axis of the mandrel so as to feed the mandrel sections somewhat faster than the drive means 7 in an axial direction. However, the rotational speed of the mandrel by the rollers 20 is somewhat less than that of the driving means 7. A cutting knife 21 is provided downstream of the driving means 8 to cut the hose periodically into lengths equal to the mandrel length x. Obliquely positioned rolls 22 similar to the feed rolls 20 are provided to receive the separated mandrel lengths.

Figure 4A:
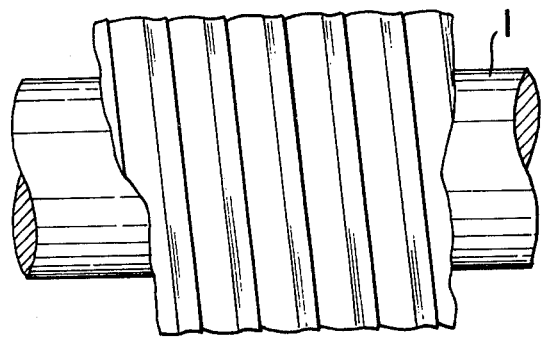
FIG. 4a is a side view of hose in accordance with the invention shown on a mandrel.
Figure 4B:
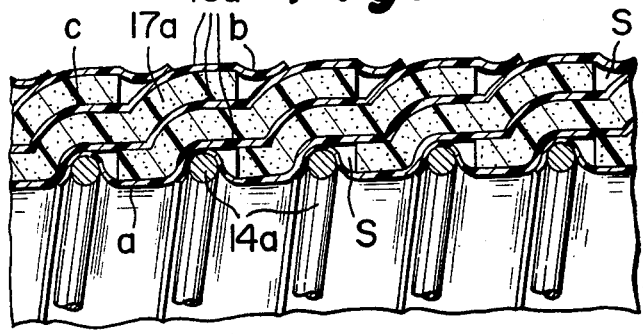
FIG. 4b is a longitudinal section of hose of the present invention.

The process of manufacturing heat insulating hose in accordance with the present invention is as follows. Mandrel sections 1a are successfully fed to the drive means 7 by the feeding rollers 20. As the mandrel is rotated and fed in an axial direction toward the left by the drive means 7, the resin coated wire 14a unwound from the reel 14 winds onto the peripheral surface of the mandrel in helical form and with constant pitch. The pitch of the wire winding depends on the relative adjustment of rotational speed and axial feed of the mandrel. The outer face of the mandrel 1 and the plastic coated wire 14a are preheated by the heating device 18 to melt the coating resin of the piano wire 14a to assist in the adhesive effect. Then the resin belt 16a extruded from the extruder 16 in the melted state and the thick flexible foam plastic resin belt 17a are wound on the mandrel 1 together in helical form and with successive convolutions overlapping so that one side portion a of the belt 16a contacts the mandrel 1 and the plastic coated wire 14a to form an inner tube while the opposite side portion b of the belt 16a forms an outer tube. The middle portion c of the belt 16a is superimposed with the belt 17a and extends between the inner tube and the outer tube thereby defining spaces between the inner and outer tubes in helical form. The foam plastic resin belt 17a extends in helical form through the spaces between the inner and outer tubes as seen in FIG. 4b.

As the axial feeding speed of the mandrel 1 by the drive means 8 is lower than that of the drive means 7 and the rotational speed of the mandrel 1 by the drive means 8 is faster than that of the drive means 7, succeeding mandrel sections fed by the drive means 7 are forced axially into firm engagement with the mandrel sections fed by the drive means 8. Thus, a firm connection between the preceding and succeeding mandrel sections is maintained and the plastic coated wire 14a, the resin belt 16a and the insulating belt 17a are wound on the mandrel without any creasing or discontinuity between successive mandrel sections.

After the belts 16a and 17a are wound on the mandrel, the mandrel passes under the cooling device 19 so that the melted belt 16a is cooled and bonds the overlapping convolutions of the belts into a unitary structure to form the hose.

The mandrel with the hose formed thereon then passes through the drive means 8 to the knife 21 which is actuated intermittently to cut the hose into sections having a length equal to that of the mandrel section. The mandrel separates from succeeding sections at its connection and the mandrel sections are then withdrawn from the hose and returned to the feeding rollers 20. The feeding rollers 20 feed the mandrel faster in an axial direction than the drive means 7 but rotate slower than the drive means 7 so that the projection 2 at the forward end of the mandrel section is inserted into the bore 4 of the preceding mandrel section and the key 3 engages automatically with the recess 5.

The extent of overlapping of the helically wound belts 16a and 17a and the pitch of the wire and of the belts is controlled by the width of the belts and the rate of axial fed of the mandrel in relation to its speed of rotation. The extruded plastic belt 16a is sufficiently wider than the plastic foam belt 17a to form both the inner and outer surfaces of the hose. The foam belt is thus covered on both sides and thereby protected.

In the embodiment shown in FIG. 4b, the width of resin belt 16a is more than three times of the pitch of piano wire 14a and the edges or sides of foam plastic resin belt or tape 17a overlaps each other. The material used for said belt 16a is soft vinyl resin such as polyethylene, polypropylene, polyethylene terephthalate, nylon, polyvinyl chloride, polyvinylidene chloride, polystyrene or thermoplastic resins, etc. The material used for said thick foam plastic resin belt or tape 17a is urethane resin polystyrene, polystylene, polypropylene, polyvinyl chloride, etc.

In the hose according to the invention the thick flexible foam plastic resin belt or tape 17a extends between outer and inner tubes in helical form. The interior of the hose is effectively heat insulated without losing its flexibility. Therefore, the hose is suitable for the conducting tube of drain water in an air cooler, or heating fluid in heating apparatus. Successive convolutions of the belt 16a adhere to each other so as to form inner and outer tubes and the foam plastic belt or tape 17a is surrounded by the outer and inner tubes and is held by the partitions c, that is middle portion of the belt 16a, in predetermined position without using adhesive. As explained in connection with FIGS. 1a and 1b, hose of the present invention is manufactured continuously and automatically with high efficiency.

As is apparent from FIGS. 1b and 1c, it is possible to adjust the thickness of the inner and outer tubes by changing the relative position between belts 16a and 17a. If the width of the side portion a of the resin belt 16a in FIG. 1c is increased, the thickness of the inner tube is increased, whereas, if the width of the outer side portion b of the resin belt 16a is increased, the thickness of the outer tube is increased. The wall thickness of the hose increases according to increase of thickness or width or decrease of feeding pitch of belt 17a. If the width of the belt 17a increases together with the width with reference to the feeding pitch of the belt 16a, the number of layers formed by belt 17a increases.

Figure 5:
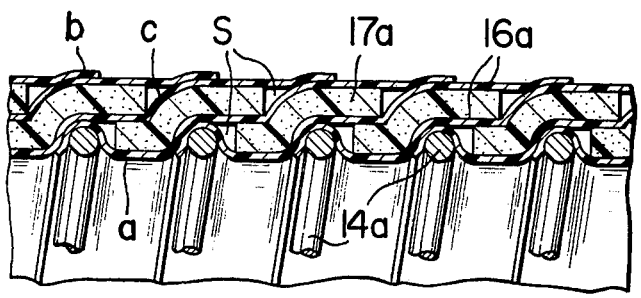
FIG. 5 is a longitudinal section of a hose of another embodiment of the present invention and FIG. 6 is a side view with a partial longitudinal section of a hose of a further embodiment of the present invention.

In another embodiment of the invention illustrated in FIG. 5, the belts 16a and 17a are narrower than in FIG. 4b in relation to the pitch of the wire 14a so that there are only two overlapping layers of the plastic foam belt 17a. The belt 16a is sufficiently wider than the belt 17a to form both inner and outer surfaces of the hose. It will be noted that in both FIGS. 4b and 5 the resin covered wire 14a is flush with the inner surface of the hose, the contiguous portions of the belt 16a conforming to the shape of the wire and being bonded to it. Small spaces S at the edges of the foam plastic belt 17a are closed and provided insulation.

Figure 6:
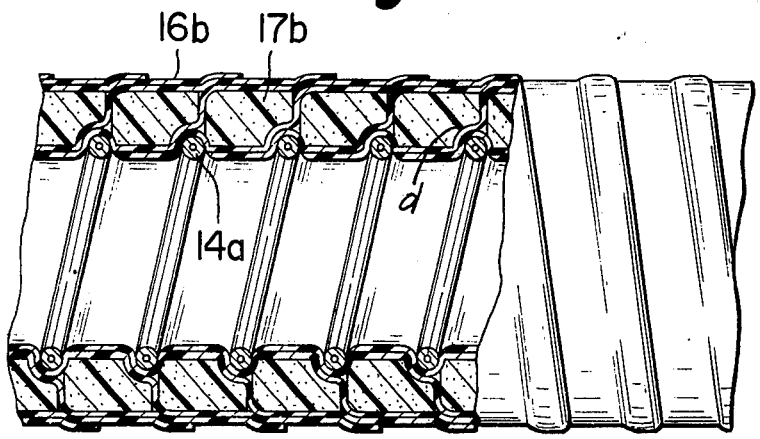

FIG. 6 shows another embodiment of the present invention in which the width of the belt 17b is approximately the same as the pitch or lead of the piano wire 14a and the belt 17b has a recess d to conform with piano wire 14a. In this construction, successive convolutions of the belt 17n do not overlap each other, so that the outer surface of the hose becomes flat. The width of the resin belt 16b is large enough so as to obtain thick inner and/or outer tubes.

It is also possible to employ double or multiple helices instead of a single helix in the insulated tube construction in accordance with the invention.

EXAMPLE

| | |
|---|---|
| Diameter of mandrel 1 | 19mm |
| Length of mandrel 1 | 5mm |
| Feed speed of mandrel 1 | 8m/min |
| Rotational speed of mandrel 1 | 8 R.P.M. |
| Piano wire 14a | Steel wire (dia. 1mm) coated by semi-rigid polyvinyl chloride, thickness 0.5mm |
| Extruder 16 | Flexible P.V.C. at temperature 180°C |
| Width of belt 16a | 40mm |
| Thickness of belt 16a | 0.3mm |
| Foam plastic resin belt 17a | Expandable cross linked polyethylene (20 times) |
| Width of belt 17a | 14mm |
| Thickness of belt 17a | 2mm |

With these parameters the hose shown in FIG. 5 is obtained.

| | |
|---|---|
| Outer diameter of hose | 30 mm |
| Inner diameter of hose | 19 mm |
| Thickness of hose | 5.5 mm |
| Pitch of helix | 10 mm |

What we claim and desire to secure by Letters Patent is:

1. A heat insulating hose comprising a first flexible strip of heat insulating material and a wider thinner second flexible strip of plastic material which extends laterally beyond both edges of said first strip, said second strip having first and second side portions and a middle portion between said side portions, said first and second strips being wound helically together as a composite strip in successive overlapping convolutions with said first side portion of said second strip at least partially underlying said first strip and underlying a succeeding convolution of said composite strip so that overlapping first side portions of successive convolutions of said second strip form a continuous inner lining of the hose; said second side portion of said second strip overlying a preceding convolution of said first strip and partially underlying said second side portion of a succeeding convolution of said second strip so that overlapping second side portions of successive convolutions of said second strip form a continuous outer covering of the hose, said first strip being confined between said inner lining and said outer covering of the hose, said middle portion of said second strip connecting said first and second side portions thereof and being disposed between successive convolutions of said first strip, said overlapping portions of said second strip being bonded together to form a continuous hose.

2. A hose according to claim 1, in which the width of said first strip is approximately equal to the pitch of the helical winding of said strips, successive convolutions of said first strip being disposed edge-to-edge to one another with said middle portion of said second strip between them.

3. A hose according to claim 1, in which the width of said first strip is greater than the pitch of the helical winding of said strips, successive convolutions of said first strip being disposed in partially overlapping relation with one another with said middle portions of said second strip between them.

4. A hose according to claim 3, in which the width of said first strip is greater than twice the pitch of the helical winding of said strips, successive convolutions of said first strip being disposed in multiple overlapping relation with one another with said middle portions of said second strip between them.

5. A hose according to claim 1, in which a spirally wound plastic covered wire is embedded in the inner surface of said hose and is substantially flush with the inner surface of convolutions of said second strip, the plastic covering of said wire being bonded with said second strip.

6. A hose according to claim 5, in which convolutions of said wire are disposed between successive convolutions of said first strip.

7. A hose according to claim 1, in which said first strip is of foam plastic material.

8. A hose according to claim 7, in which said first strip is of a foam material selected from the group consisting of urethane resin, polyethylene, polystyrene, polypropylene and polyvinyl chloride.

9. A hose according to claim 1, in which said second strip is of a thermoplastic synthetic resin selected from the group consisting of polyethylene, polypropylene, polyethylene terephthalate, nylon, polyvinyl chloride, polyvinylidene chloride and polystyrene.

10. A hose according to claim 1, in which said second strip is of thermoplastic material and overlapping portions of said second strip are bonded to one another without adhesive.

11. A hose according to claim 1, in which said inner lining comprises at least two layers of portions of successive convolutions of said second strip bonded together.

12. A hose according to claim 1, in which said outer covering comprises at least two layers of portions of successive convolutions of said second strip bonded together.

13. A hose according to claim 1, in which successive convolutions of said second strip define spaces only partially occupied by said first strip leaving sealed air spaces between said inner lining and outer convering.

* * * * *